US007543296B2

(12) United States Patent
Hunt et al.

(10) Patent No.: US 7,543,296 B2
(45) Date of Patent: Jun. 2, 2009

(54) TIME BASED MULTI-TIERED MANAGEMENT OF RESOURCE SYSTEMS

(75) Inventors: Guerney D. H. Hunt, Yorktown Heights, NY (US); Lily B. Mummert, Mahopac, NY (US); William G. Pope, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 952 days.

(21) Appl. No.: 10/650,107

(22) Filed: Aug. 26, 2003

(65) Prior Publication Data

US 2005/0049884 A1    Mar. 3, 2005

(51) Int. Cl.
G06F 9/46        (2006.01)
G06F 15/173    (2006.01)
G06F 15/16      (2006.01)

(52) U.S. Cl. .................... 718/104; 718/100; 718/102; 718/105; 709/224; 709/226; 709/229

(58) Field of Classification Search ............. 718/1–108; 709/201, 202, 206, 217, 218, 219, 223, 224, 709/226, 229, 230
See application file for complete search history.

(56) References Cited

U.S. PATENT DOCUMENTS

| | | | | |
|---|---|---|---|---|
| 4,701,848 A * | 10/1987 | Clyde | ......................... | 719/321 |
| 5,557,551 A * | 9/1996 | Craft | ......................... | 702/130 |
| 5,956,745 A | 9/1999 | Bradford et al. | ............ | 711/137 |
| 5,960,169 A * | 9/1999 | Styczinski | ..................... | 714/6 |
| 6,058,489 A | 5/2000 | Schultz et al. | ................. | 714/7 |
| 6,065,085 A * | 5/2000 | Odenwald et al. | ........... | 710/314 |
| 6,374,266 B1 * | 4/2002 | Shnelvar | ..................... | 707/204 |
| 6,427,152 B1 * | 7/2002 | Mummert et al. | ........... | 707/102 |
| 6,463,454 B1 * | 10/2002 | Lumelsky et al. | ........... | 718/105 |
| 6,473,802 B2 * | 10/2002 | Masters | ....................... | 709/229 |
| 6,584,370 B2 * | 6/2003 | Denton et al. | ................ | 700/107 |
| 6,779,016 B1 * | 8/2004 | Aziz et al. | ................... | 709/201 |
| 6,815,229 B1 * | 11/2004 | Halliyal et al. | ................. | 438/14 |
| 6,907,607 B1 * | 6/2005 | Mummert et al. | ............ | 718/104 |
| 6,988,087 B2 * | 1/2006 | Kanai et al. | .................... | 705/80 |
| 7,058,712 B1 * | 6/2006 | Vasko et al. | ................. | 709/224 |
| 7,058,947 B1 * | 6/2006 | Raja et al. | .................... | 718/104 |
| 7,065,570 B2 * | 6/2006 | Fukushima et al. | ......... | 709/223 |
| 7,103,711 B2 * | 9/2006 | Valdevit | ...................... | 711/111 |

(Continued)

OTHER PUBLICATIONS

Advances in Windows NT Storage Management, ACM, vol. 31, Issue 10 (Oct. 1998).*

(Continued)

*Primary Examiner*—Lewis A Bullock, Jr.
*Assistant Examiner*—Abdullah Al Kawsar
(74) *Attorney, Agent, or Firm*—Ido Tuchman; Anne V. Dougherty

(57) ABSTRACT

A method, system, and computer program for managing multi-tiered resource systems, such as Storage Area Networks (SANs). Resource tiers in the resource system are examined to if they are in compliance with a management policy. If a resource tier is not in compliance with the management policy, a processing operation automatically increases available capacity in containers in order to bring the containers in compliance with the management policy. The management policy may, for example, include a requirement that an expiration date of the resource tier occur after a maintenance date.

7 Claims, 11 Drawing Sheets

U.S. PATENT DOCUMENTS

| | | | | |
|---|---|---|---|---|
| 7,111,297 | B1* | 9/2006 | Sankaranarayan et al. | 718/104 |
| 7,124,059 | B2* | 10/2006 | Wetzer et al. | 702/184 |
| 7,146,353 | B2* | 12/2006 | Garg et al. | 707/2 |
| 7,275,103 | B1* | 9/2007 | Thrasher et al. | 709/224 |
| 7,290,259 | B2* | 10/2007 | Tanaka et al. | 718/1 |
| 7,406,315 | B2* | 7/2008 | Uhlik et al. | 455/452.1 |
| 2003/0110190 | A1* | 6/2003 | Achiwa et al. | 707/203 |
| 2003/0220899 | A1* | 11/2003 | Numanoi et al. | 707/1 |
| 2004/0225659 | A1* | 11/2004 | O'Brien et al. | 707/9 |
| 2004/0243699 | A1* | 12/2004 | Koclanes et al. | 709/224 |
| 2005/0022201 | A1* | 1/2005 | Kaneda et al. | 718/104 |

OTHER PUBLICATIONS

William G. Pope and Lily B. Mummert, The use of life expectancy to manage lotus notes email storage, CMG conference 1999.*

Tivoli Storage Network Manager, IBM 2001.*

IBM RAMAC Virtual Array, IBM International Technical Support Organization, San Jose, First Edition, Jul. 1997.

R. Levy et al., Performance Management For Cluster Based Web Services.

William G. Pope and Lily B. Mummert, The Use of Life Expectancy to Manage Lotus Notes Email Storage, IBM TJ Watson Research Center.

Luis Felipe Cabrera et al., Advances in Windows NT Storage Management, IEEE Computer, Oct. 1998.

Justin Moore et al., Managing Mixed-Use Clusters with Cluster-on-Demand.

Guillermo A. Alvarez et al., Minerva: An Automated Resource Provisioning Tool For Large-Scale Storage Systems.

K. Appleby et al., Océano-SLA Based Management of a Computing Utility.

* cited by examiner

TIME BASED MULTI-TIERED MANAGEMENT OF RESOURCE SYSTEMS

FIELD OF THE INVENTION

The present invention relates generally to resource management, and more particularly, to allocation of storage in a centralized storage facility.

BACKGROUND

In general, a centralized storage facility, such a Storage Area Network (SAN), may have several servers attached. Each server may have several storage volumes or file systems. Each volume requires space for its data to grow. An advantage of the SAN is that free storage can be centralized and allocated when needed, thereby reducing the need for unused storage at the installation level. Additional storage can be ordered and installed in one place, then allocated to storage volumes as needed. Underlying mechanics exist for performing storage system allocations and reconfigurations, and in some cases, they may be performed during normal operations. The problem in the art is how much excess storage to keep on hand, and when and where to allocate storage so as to reduce the total need for storage while maintaining a low risk of outage due to lack of storage.

SUMMARY OF THE INVENTION

The present invention addresses the above-mentioned limitations of conventional storage systems by providing an automated technique for managing multi-tiered resource systems. The invention beneficially allocates capacity in resource systems so as to reduce the total need for capacity while maintaining a low risk of outage due to lack of capacity. The invention can further help resource administrators more efficiently maintain and control multi-tiered resource systems.

Thus, an exemplary aspect of the present invention involves a method for managing a multi-tiered resource system. The method includes a determining operation to determine if a resource tier is in compliance with a management policy. If the resource tier is not in compliance with the management policy, a processing operation automatically attempts to bring the resource tier in compliance with the management policy. In one embodiment of the invention, the management policy includes requiring that an expiration date of the resource tier occur after a maintenance date.

Another exemplary aspect of the invention is a system for managing a multi-tiered resource system. The system includes a determining module configured to determine if a resource tier is in compliance with a management policy. A processing module is configured to automatically attempt to bring the resource tier in compliance with the management policy if the resource tier is not in compliance with the management policy.

Yet another exemplary aspect of the invention is a computer program product with computer readable program codes for managing a multi-tiered resource system. The program codes are configured to determine if a resource tier is in compliance with a management policy, and automatically attempt to bring the resource tier in compliance with the management policy if the resource tier is not in compliance with the management policy.

The foregoing and other features, utilities and advantages of the invention will be apparent from the following more particular description of various embodiments of the invention as illustrated in the accompanying drawings.

DETAILED DESCRIPTION OF THE INVENTION

Figure 1:
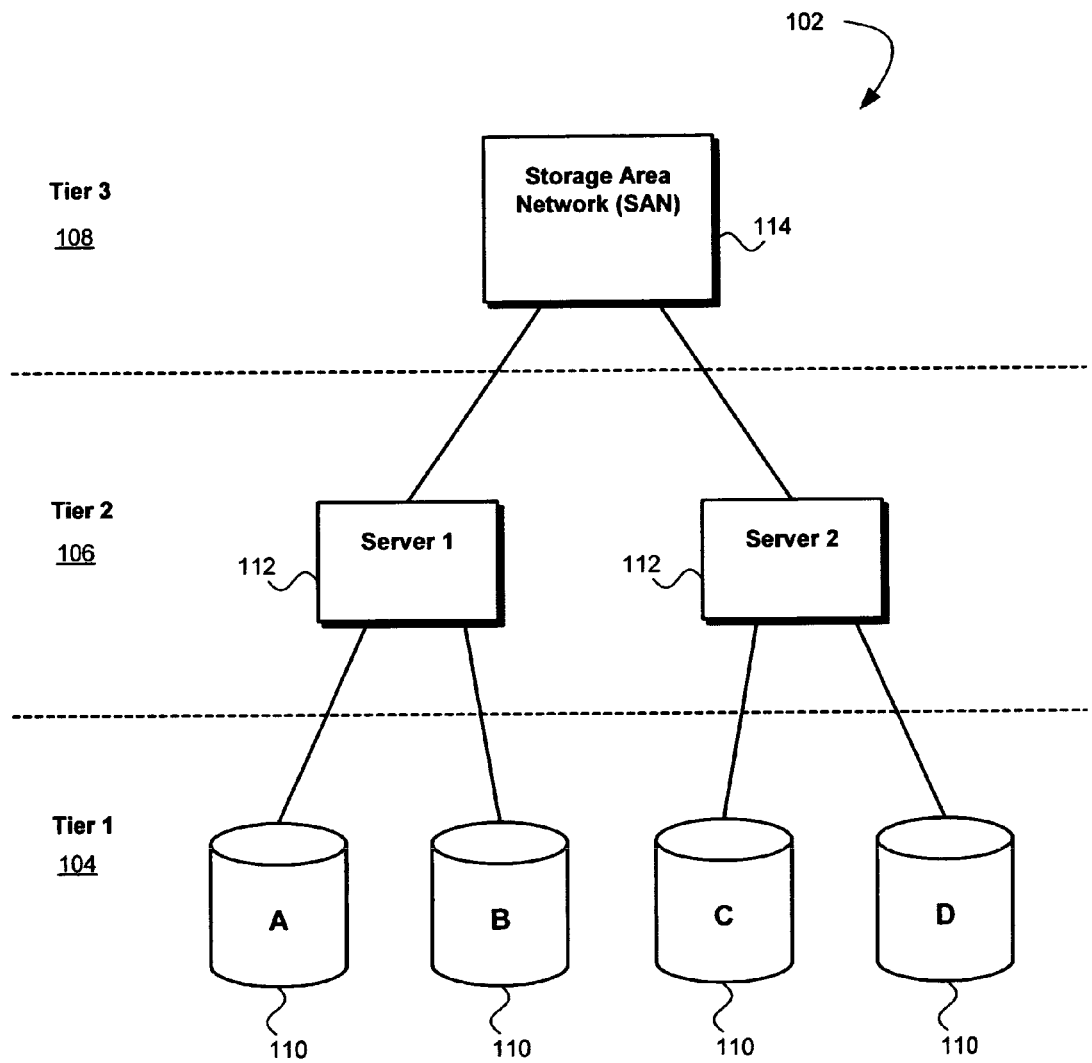
FIG. 1 shows an exemplary network environment embodying the present invention.

The following description details how the present invention is employed to manage storage systems. Throughout the description of the invention reference is made to FIGS. 1-7. When referring to the figures, like structures and elements shown throughout are indicated with like reference numerals.

In FIG. 1, an exemplary storage system 102 contemplated by the present invention is shown. It is initially noted that the storage system 102 is presented for illustration purposes only, and is representative of countless configurations in which the invention may be implemented. Thus, the present invention should not be construed as limited to the system configuration shown in the figure.

In one embodiment of the invention, the storage system 102 is a multi-tiered storage system having a hierarchical structure. For example, the storage system 102 may include a bottom-level tier 104, a medium-level tier 106, and a top-level tier 108. The invention may be utilized in systems with various other hierarchical structures. It is also noted that the storage system arrangement is generally dynamic in nature. Thus, the storage system 102 may expand, shrink, and reorganize over time according to system requirements. Furthermore, it may be observed that as one travels up the storage hierarchy, the cost of making system changes (also referred to as the cost of intervention), such as increasing the size of a logical storage volume or adding a storage volume to a server, generally increases.

At the lowest point of the hierarchy, the bottom-level tier 104, the storage system 102 is composed of a plurality of storage volumes 110. The storage volumes 110 can be, for instance, disk partitions or logical volumes. In one embodiment of the invention, the storage volumes 110 exist as logical volumes in Redundant Array of Inexpensive Disks (RAIDs).

Modifying the storage capacity of logical volumes is often a very simple undertaking. Modern operating systems typically provide a programmatic interface to change the storage capacity of a logical volume with little or no interruption of service. For example, operating systems may include a simple command line to extend a storage volume. In addition, storage devices are readily available in the marketplace and are typically inexpensive to purchase and install. Thus, the cost of intervention for components in the bottom-level tier 104 is relatively small.

The middle-level tier 106 of the storage system 102 includes storage servers 112. Each server 112 is coupled to a group of storage volumes. Modifying components in the middle-level tier 106 typically involves more effort than in the bottom-level tier 104. For example, a server and its applications may need to be reconfigured to work with a newly added storage volume.

At the highest point in the hierarchy, the top-level tier 108 may represent the Storage Area Network (SAN). The cost of intervention at the top-level tier 108 may be considerable. Modifications to the top-level tier 108 may require network administrators with specialized skills. Furthermore, intervention at the top-level tier 108 may require interruption of service to the entire storage system 102 for a considerable length of time.

Figure 2:
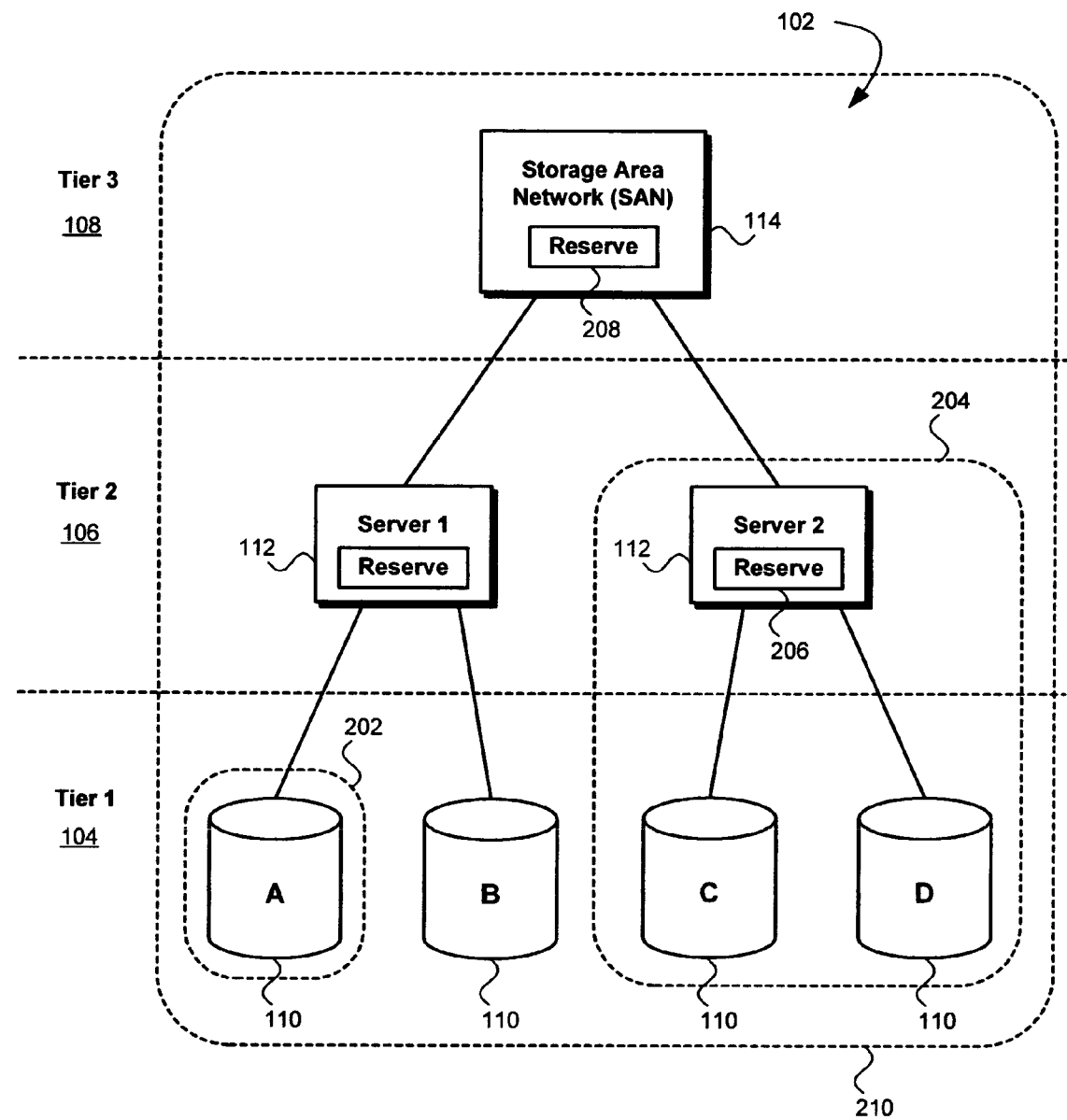
FIG. 2 is a logical representation of the network environment illustrating containers.

An important aspect in the present invention is the concept of a container. FIG. 2 is a logical representation of the network environment 102 illustrating containers. As used herein, a container is an identifiable part of a resource having a storage limit. A container, for example, may be a disk partition, a group of storage volumes, or an entire storage system. Attempts to exceed a container's limit generally result in degraded performance or failure. A container may include mechanisms to change its storage limits (either increasing or decreasing its limits).

Every container has no more than one parent and the parent for a container may have multiple children. A container for a component in a storage hierarchy encompasses the storage and data of its children, if any, and a reserve of unused storage that may be used to increase the limits of its children. If the limit of a child container is decreased, the amount of the decrease is returned to its parent's reserve. For example, each storage volume 110 is considered a volume container 202. A server container 204 includes a server 112, all of the storage allocated to its child containers, and a server reserve 206. Furthermore, the entire storage system 102, including the SAN 114, the servers 112, storage volumes 110, and a system reserve 208 is a system container 210.

Figure 3:
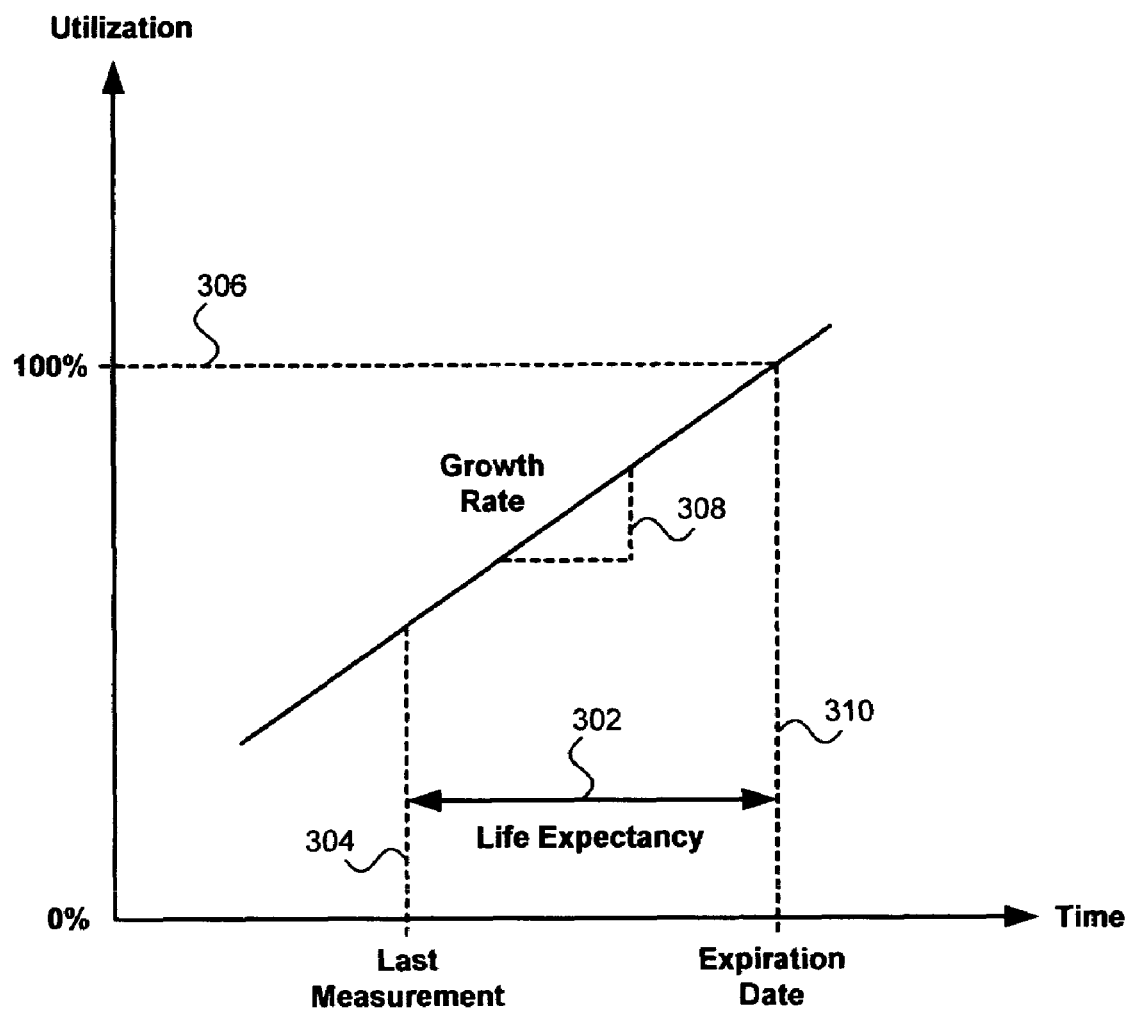
FIG. 3 is a graphical representation of container growth rate, life expectancy, and expiration date.

As illustrated in FIG. 3, each container in a storage system has a life expectancy 302. The life expectancy 302 of a container is the period of time from the last measurement 304 of the container until the container's resource utilization reaches its limit 306. One method for estimating life expectancy is described in U.S. Pat. No. 6,427,152 to Mummert et al., and is incorporated in its entirety herein by reference. It is contemplated that other methods for calculating life expectancy 302 may be employed by the present invention.

If the resource consumption of the container exhibits a positive growth rate 308, its life expectancy 302 is finite. Otherwise, the container's life expectancy 302 is infinite. The life expectancy of a tier is the minimum life expectancy of the containers in that tier. The time at which a container's resource utilization is expected to reach its limit 306 is referred to as the container's expiration date 310. The expiration date of a tier is the soonest expiration date of the containers in that tier. It is noted that although FIG. 3 illustrates resource usage as a linear model, any predictive model may be used in accordance with the present invention.

As mentioned above, the present invention involves automatically managing a multi-tiered storage system. Managing a storage system can include determining if a storage tier of the storage system is in compliance with a management policy and, if the storage tier is not in compliance with the management policy, automatically attempting to bring the storage tier into compliance. In a particular embodiment of the invention, the management policy is a requirement that the expiration date of the containers in a storage tier occur after a maintenance date for the tier.

A maintenance date represents the beginning of a maintenance window during which the storage system may be modified with little or no adverse impact on the operations of the entity utilizing the storage system. Often times, maintenance dates are scheduled on official holidays or late at night to minimize disruption to users. Each tier in the system can be associated with a maintenance date. Lower tiers typically have maintenance dates that are no later than upper tiers, since lower tiers can be reconfigured more quickly and easily.

Figure 4:
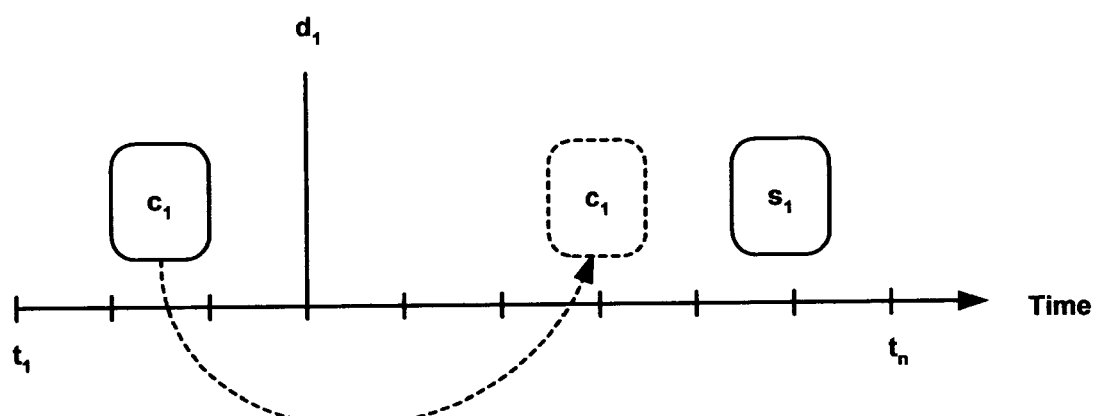
FIG. 4 shows how a management policy is implemented in accordance with one embodiment of the present invention.

To illustrate how a management policy is implemented in accordance with one embodiment of the present invention, reference is made to FIG. 4. As shown, the expiration date of container $c_1$ occurs before its scheduled maintenance date $d_1$. Thus, container $c_1$ is not in compliance with the management policy. By allocating additional storage from the reserve of server $s_1$, the expiration date of container $c_1$ is extended, as represented by the dotted line. Note that the reallocation of storage does not change the expiration date for server $s_1$. Server $s_1$ contains the same amount of data and storage as it did before the reallocation of storage.

In one embodiment of the invention, let C be a list of containers to be managed by the present invention. Each entry $C_j$ is a tuple $(n_j, a_j, f_j, l_j, e_j, u_j, d_j, p_j)$, where $n_j$ is the name of container j, $a_j$ is its limit, $f_j$ is the amount of free space it has, $l_j$ is the lead time required to change its limit, $e_j$ is its life expectancy, $u_j$ is its utility function, $d_j$ is the container's maintenance date, and $p_j$ is the expiration date for the container. The life expectancy and expiration date of each container will be calculated by the present invention embodiment, the remainder of the tuple data is input. For containers which have children, the reserve is input as free space, and the limit is equal to the size of the reserve. For the purposes of the life expectancy calculation, we additionally associate with each container variables A and F used to accumulate container limits and free space. For containers with no children, A and F are equal to a and f. Otherwise, the container limit A will be calculated as the sum of the limits of its children plus the size of the reserve for the parent, and its free space F will be calculated as the sum of the free space for all its children plus the size of the reserve for the parent. The difference in these figures is the size of the storage reserve for the parent. Moreover, let G be a table that contains the parent-child relationships for each container. Each entry $G_j$ is a tuple $\{C_j, \text{child-list}\}$, where child-list is a list of direct children of $C_j$. Finally, let U be a utility threshold used to prioritize which containers will receive additional capacity, if needed. It is noted that although the above structures are described as tables, those skilled in the art will recognize that they may be embodied using other data structures. For example, G could be embodied as a directed graph.

Figure 5:
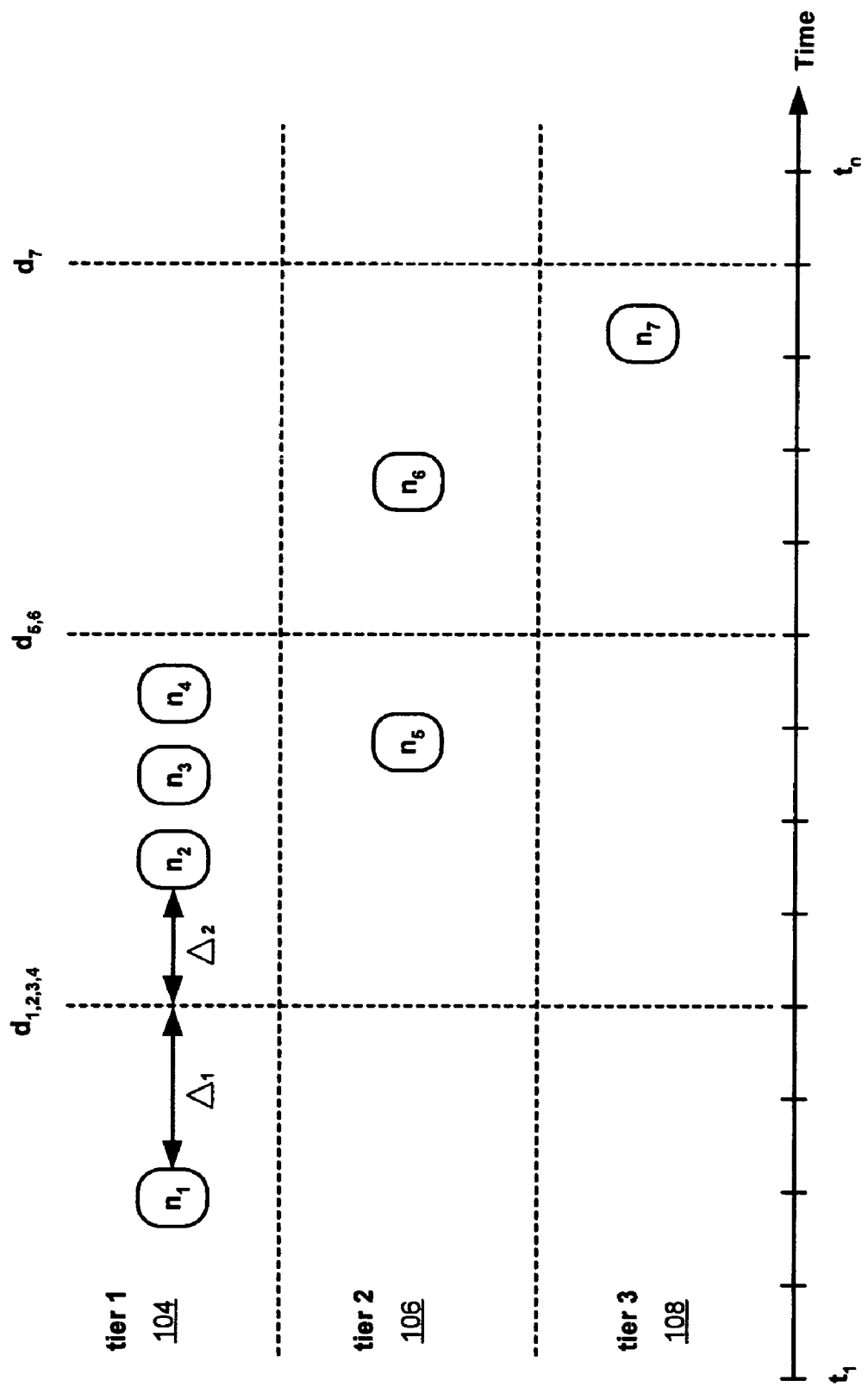
FIG. 5 illustrates date deltas in conjunction with the present invention.

One embodiment of the invention utilizes date deltas, as depicted in FIG. 5. In this figure, seven containers marked $n_1$ to $n_7$ are presented. Containers $n_1$, $n_2$, $n_3$, and $n_4$ correspond to components in the bottom-level tier 104 of a storage system. Containers $n_5$ and $n_6$ correspond to components in the middle-level tier 106, and container $n_7$ corresponds a component in the top-level tier 108 of the storage system.

Maintenance dates are shown relative to a timeline marked $t_1$ to $t_n$. The timeline starts at $t_1$, when the last life expectancy measurements were taken. Three key maintenance dates are indicated, one for each tier. The bottom tier maintenance date is assigned to $d_1$, $d_2$, $d_3$, and $d_4$, which are the maintenance dates for the bottom tier containers. The middle tier maintenance date is assigned to $d_5$ and $d_6$, which are the maintenance dates for the middle tier containers. The top tier maintenance date is assigned to $d_7$. In FIG. 5, maintenance dates $d_1$, $d_2$, $d_3$, and $d_4$ are all the same date. Likewise, maintenance dates $d_5$ and $d_6$ are the same date. The containers $n_1$ to $n_7$ are ordered in expiration date sequence and positioned relative to their maintenance dates. Container $n_1$ expires before its maintenance date $d_1$ and therefore has a negative delta $\Delta_1$ relative to $d_1$. The second container, $n_2$, has a positive delta $\Delta_2$ relative to its maintenance date $d_2$ because its expiration date falls after $d_2$.

Figure 6:
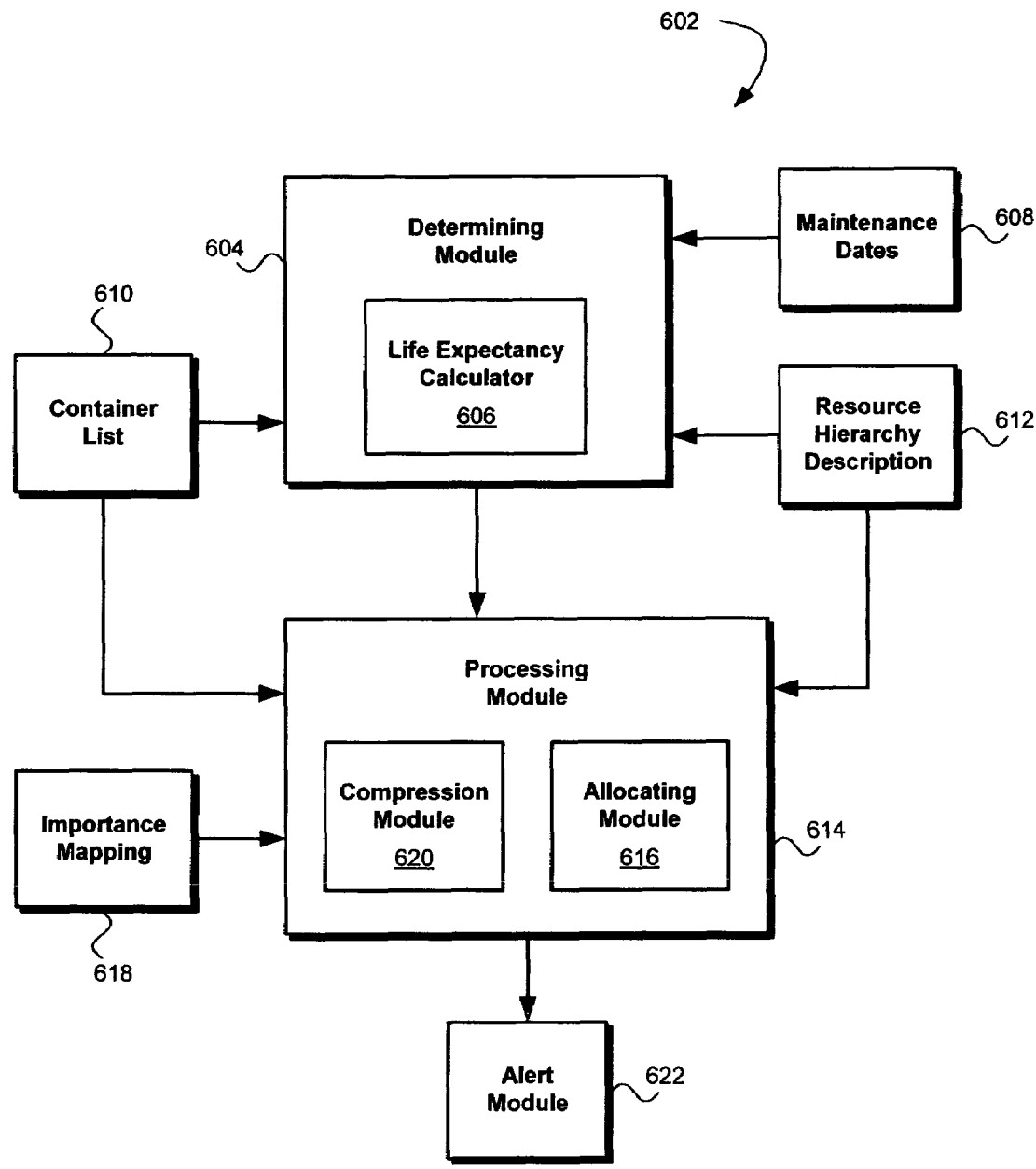
FIG. 6 shows one embodiment of a system for managing a multi-tiered resource system according to the present invention.

In FIG. 6, one embodiment of a system 602 for managing a multi-tiered resource system, such as a Storage Area Network (SAN), according to the present invention is shown. The invention is preferably applied to resource systems having the following characteristics:

1. Resources are arranged in a hierarchical manner, wherein modifications at the lowest levels are cheaper and faster than modifications at the highest levels;

2. The workload utilization and growth of the resources can be tracked and forecasted;

3. It can be determined whether additional capacity is needed, and that capacity can be added; and 4. It can be determined whether excess capacity is available and that capacity can be removed.

The system 602 includes a determining module 604 configured to periodically determine if resource tiers in the resource system are in compliance with a management policy. As mentioned above, the management policy may include requiring that an expiration date of the containers in a resource tier occur after its maintenance date. Thus, determining module 604 includes an expiration date calculator 606 configured to calculate the expiration dates of the containers.

In order to compare the container expiration dates with container maintenance dates, the determining module 604 receives a table of key maintenance dates 608 for the resource system, a list of containers in the storage system 610, and a description of the resource hierarchy 612. The description of the resource hierarchy 612 may be in the form of a graph, tree, or similar structure indicating connections between resource system components. If the determining module 604 detects that one or more containers are not in compliance with the management policy, it notifies a processing module 614.

The processing module 614 is configured to automatically attempt to bring resource tiers that are not in compliance with the management policy into compliance. In a particular embodiment of the invention, the processing module 614 is configured to increase available capacity in containers in order to bring them into compliance. For example, the processing module 614 may call upon an allocating module 616 configured to allocate additional capacity to containers belonging to the resource tier until the resource tier is in compliance with the management policy. The allocating module 616 may provide additional capacity to containers by utilizing reserve capacity or redistributing available capacity from other containers in the resource system. As described above, capacity may include storage in a storage system.

In a particular embodiment of the invention, the processing module 614 processes system resources according to their importance (also referred to as their utility) if there is insufficient capacity to bring all the containers into compliance with the management policy. For example, the processing module 614 can receive an importance mapping 618 identifying containers of greater importance in the resource system. The utility of containers may be supplied or generated by a function. Thus, the system 602 may attempt bring priority containers into compliance ahead of less important containers.

The processing module 614 may additionally or alternatively include a compression module 620 to automatically attempt to bring containers that are not in compliance with the management policy into compliance. The compression module 620 is configured to compress data within the container such that the container is in compliance with the management policy. The present invention may utilize various compression techniques known to those skilled in the art. It is contemplated that data compression may be performed as a last resort when additional capacity is unavailable to containers that are not in compliance with the management policy.

It is noted that storage allocation and compression are merely examples of mechanisms used by the processing module to bring a multi-tiered storage system into compliance. Other mechanisms include, but are not limited to, archiving old data and deletion of temporary files. Such mechanisms may be used in combination. Thus, the job of the processing module 614 in a multi-tiered storage system is to increase storage space where needed by whatever techniques are available as modules to it. The order in which different actions are performed can be encoded in the processing module 614 and may be configurable by the user.

The system 602 may also include an alert module 622. The alert module 622 is configured to alert a system administrator when the container cannot be brought in compliance with the management policy. For example, if the system 602 determines that a particular container's expiration date will occur before the next scheduled maintenance date, and there is insufficient capacity reserve to bring the container in compliance, the alert module 622 may automatically generate a notification, such as an email, voice mail, pager, or telephone call, warning the system administrator of the management policy violation. It is contemplated that the system 602 may further alert an administrator anytime a change to the storage system configuration is made or proposed. In addition, the alert module 622 may be configured to notify the administrator of an external change in the storage system, such as a hardware failure of a component that impacts the capacity of the system and triggers automatic management.

Figure 7:
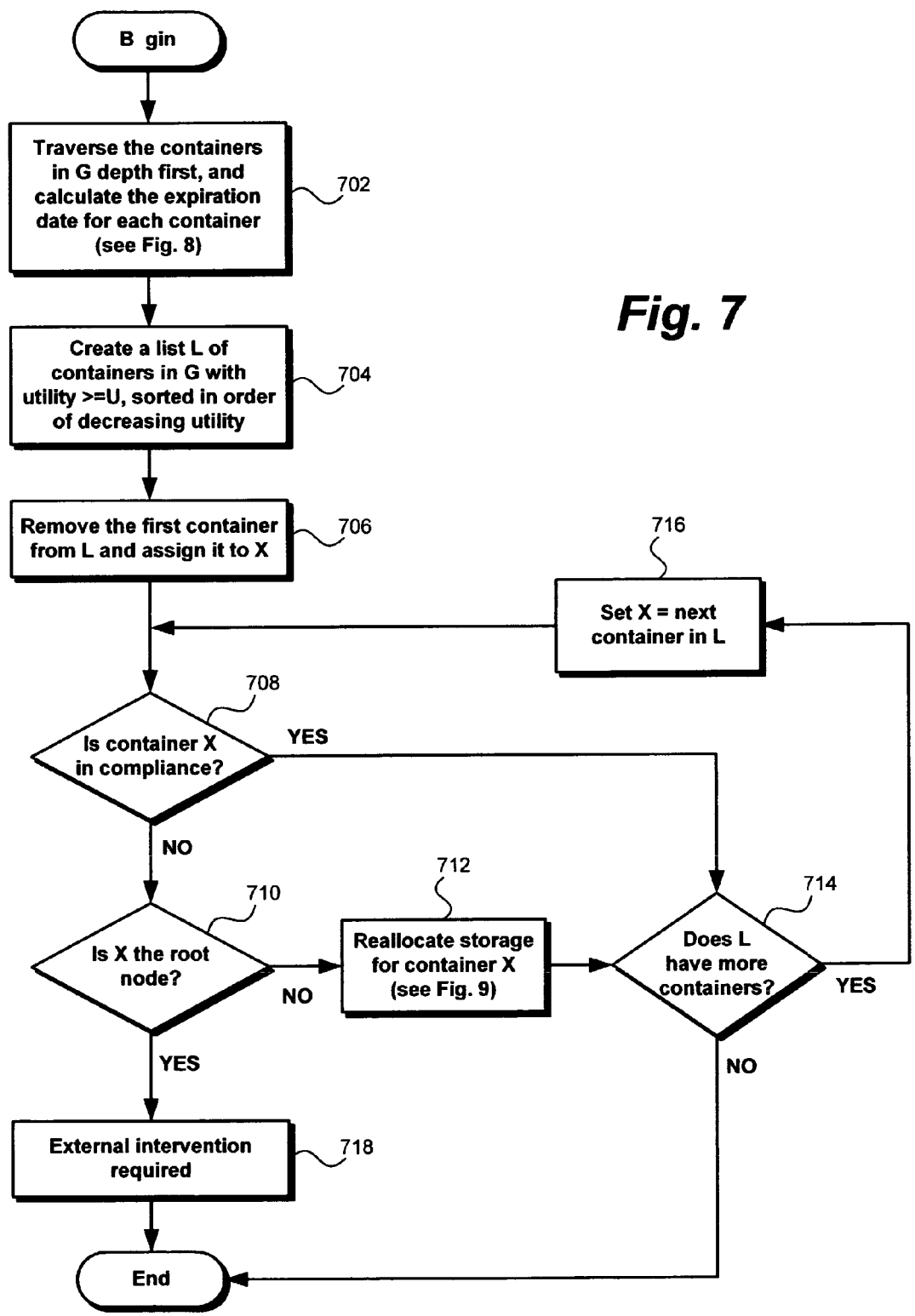
FIG. 7 shows an overview flowchart of one method for managing a multi-tiered storage system contemplated by the invention is presented.

In FIG. 7, a flowchart showing an overview of one method for managing a multi-tiered storage system contemplated by the invention is presented. It should be remarked that the logical operations shown may be implemented (1) as a sequence of computer executed steps running on a computing system and/or (2) as interconnected machine modules within the computing system. The implementation is a matter of choice dependent on the performance requirements of the system implementing the invention. Accordingly, the logical operations making up the embodiments of the present invention described herein are referred to alternatively as operations, steps, or modules.

The process begins with operation 702. During this operation, the life expectancy and expiration date of the containers in G are calculated by traversing G in depth first manner. As mentioned above, the present invention may employ various techniques known to those skilled in the art to determine container life expectancy. For example, life expectancy may the calculated by extrapolating future container storage requirements from the container's past storage requirements. In one embodiment of the invention, lead times of containers in the tier are factored into the expiration date calculation. As used herein, lead time is the time needed to complete an action. Each container may have a different lead time for actions. It is generally expected that containers in the same tier will have the same or similar lead times, and that higher tier containers will have longer lead times than lower tier containers. In a particular configuration of the invention, the minimum life expectancy for a container should be no less than its lead time. Once calculating operation 702 is completed, control flows to operation 704.

During operation 704, a list L of the containers in G is created, sorted in order of decreasing utility (i.e., highest utility first). Furthermore, only those containers with utility greater than utility threshold U are included. Each container in L is examined in turn, starting with the first container in the list at removing operation 706. If, at determining operation 708, the container is in compliance, the container is not considered further. At determining operation 708, the method checks if the container is in compliance with a management policy. As mentioned above, the management policy may include requiring that the expiration date $p_x$ of the container occur after its maintenance date $d_x$. It is contemplated that other management policies may be used by the present invention. If the container is in compliance, control passes to query operation 714.

Retuning to determining operation 708, if the container under examination is not in compliance with the management policy, process flow passes to query operation 710. Query operation 710 checks whether the non-complying container is at the top-level tier of the storage system. If the current container is at the top tier of the storage system (is the root node of G), external intervention is required to add storage to the system, and control passes to notifying operation 718. After notifying operation 718 is performed, the process completes.

If, at query operation 710, it is determined that the container under examination is not at the top tier, control passes to reallocating operation 712. At reallocating operation 712, the process attempts to increase the limit of container x, thereby bringing it in compliance with the management policy. It is noted that even if reallocation fails, subsequent reallocation actions may still improve the state of the storage system.

After reallocating operation 712, control flows to determination operation 714. If there are more containers to be examined, the process continues by examining the next container in the list L at operations 716 and control loops back to operation 708. If there are no more containers to examine in operation 714, the process completes.

Figure 8:
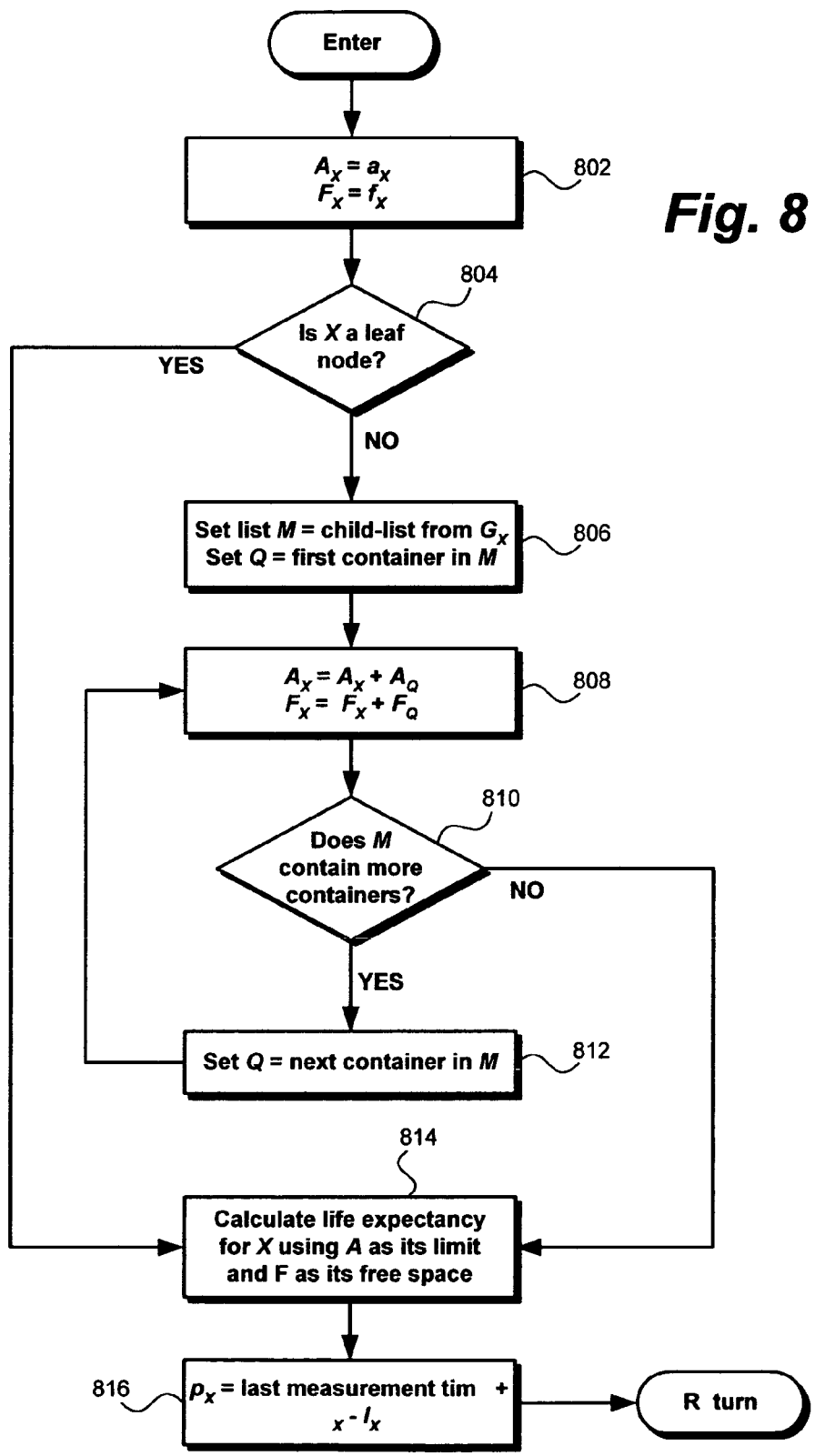
FIG. 8 shows an exemplary procedure for calculating tier expiration dates, as contemplated by the invention.

FIG. 8 shows a flowchart of one method for calculating the expiration time of a container, as contemplated by the invention. These operations are called for each container in a depth first traversal of the storage hierarchy given by G. The process begins at initializing operation 802. During this operation, the limit of X, represented by $A_x$, is assigned the container's limit, and the free space of X, represented by $F_x$, is initialized to the container's free space. Next, at query operation 804, if the container is a leaf node (is in the bottom tier), the process moves to calculating operation 814 and the container life expectancy is calculated as discussed above. Otherwise, control passes to initializing operation 806. The container limit is then calculated as the sum of the capacities for all child containers plus the size of the reserve at operation loop 806, 808, 810, and 812. Similarly, the container free space f is calculated as the sum of the free space for all child containers plus the size of the reserve at operation loop 806, 808, 810, and 812.

A list of child containers M is created at initializing operation 806 and the first container on that list is assigned to Q. At accumulating operation 808, the limit and free space is accumulated for the parent container. Since this procedure is called depth first, the values for the child containers will already have been accumulated. The list of child containers M is then checked at query operation 810, and, if there are more containers, the next container is assigned at assigning operation 812. After the assigning operation 812 is completed, the process returns to accumulating operation 808.

If, at query operation 810, there are no more containers in M, control passes to calculating operation 814, where container life expectancy is determined. For this life expectancy calculation, the data object (workload) list is the union of the data objects in the child containers. Having established the container size, free space, and data object list, the life expectancy for the container is calculated as specified above, and the risk is calculated at operation 814. Once calculating operation 814 is completed, control passes to calculating operation 816. This operation calculates the expiration time of the container. It increases the last measurement time for the life expectancy calculation by the life expectancy value $e_x$ calculated in operation 814, and decreases it by the lead time $l_x$ for limit changes to that container. The process for the container then completes.

Figure 9A:
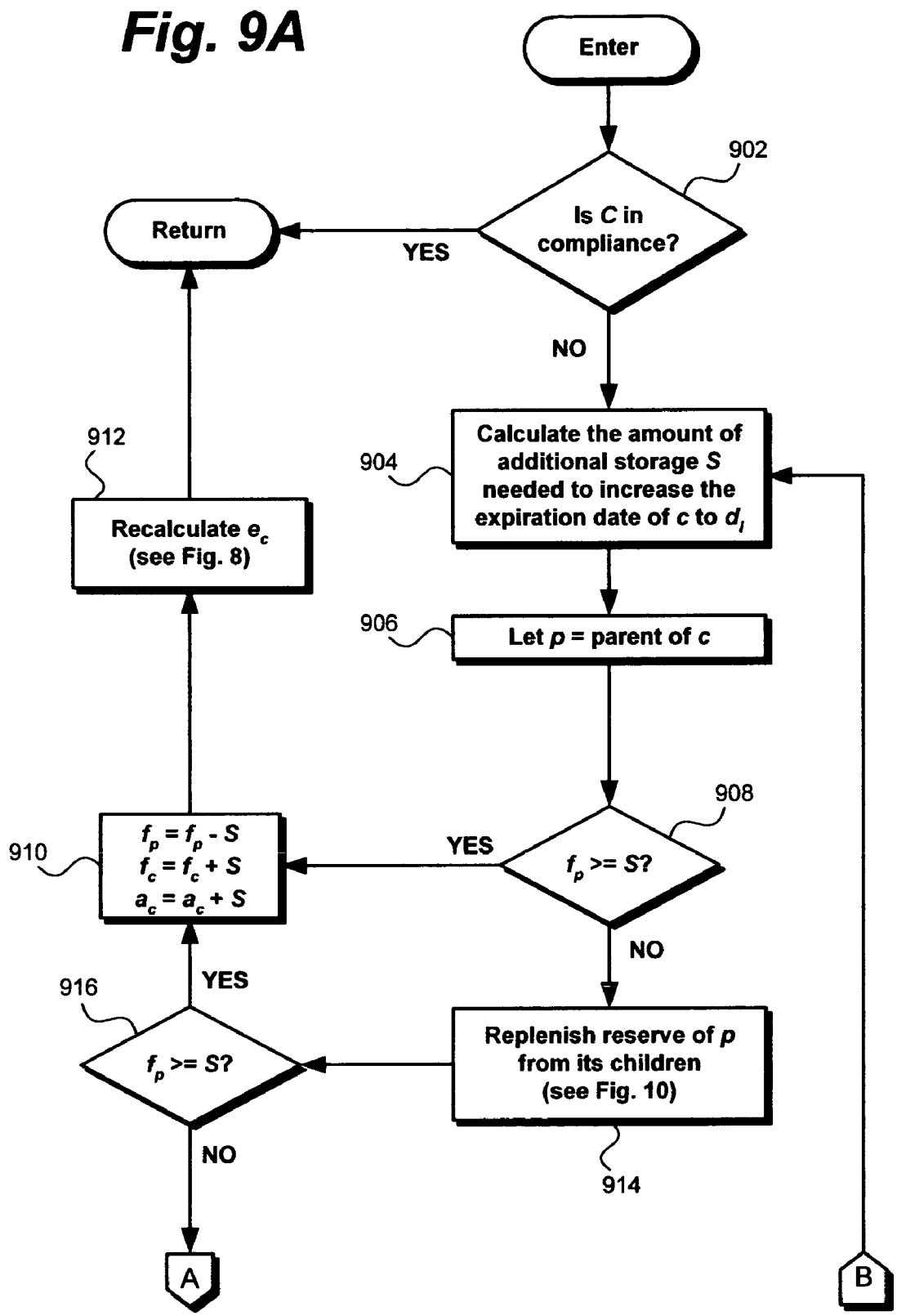
FIGS. 9A and 9B show an exemplary reallocation procedure within a tier, as contemplated by the present invention.
Figure 9B:
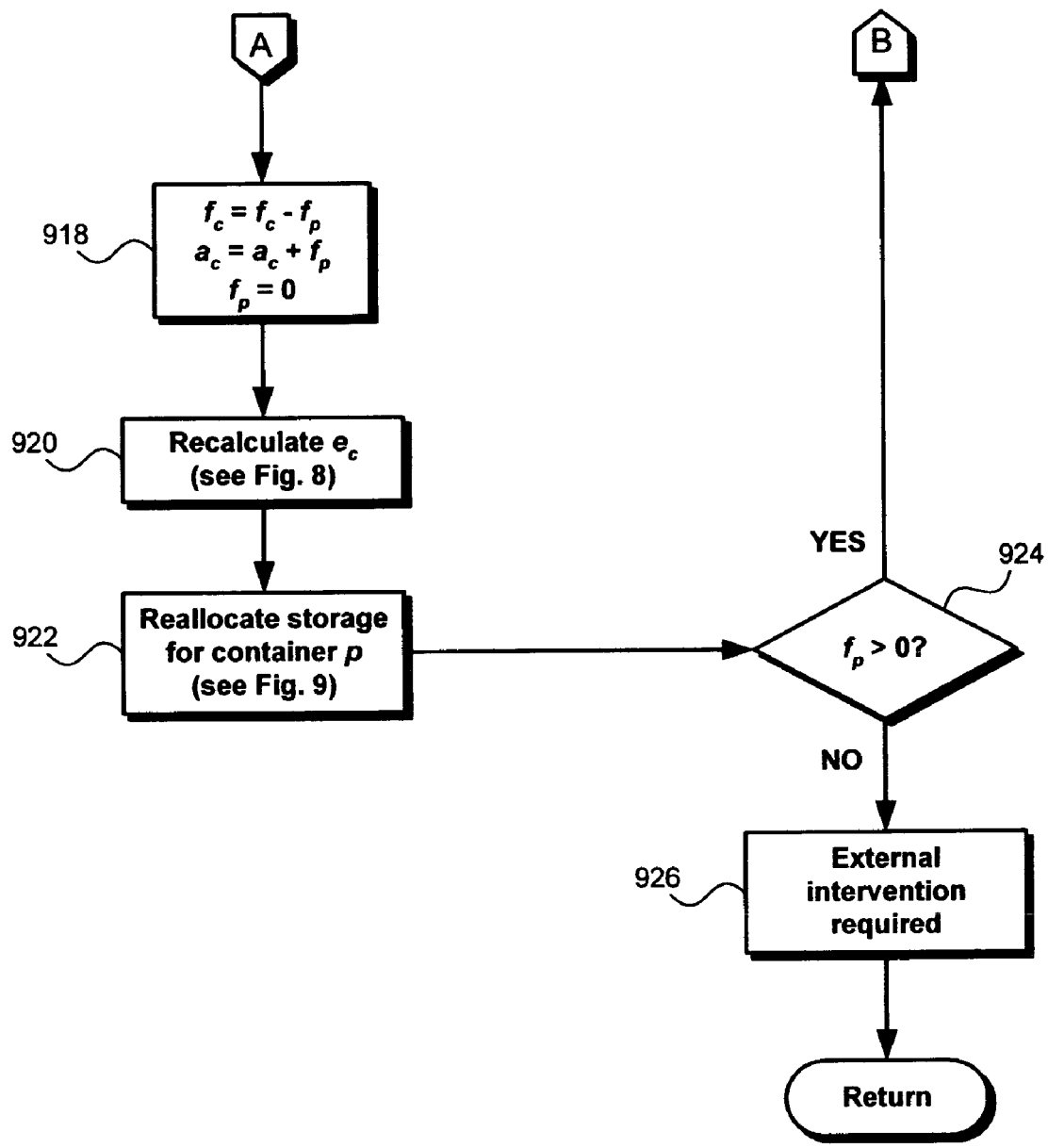

FIGS. 9A and 9B show a flowchart of a reallocation procedure for a container contemplated by the present invention. The procedure begins examining operation 902 to determine whether the container is in compliance or not. If the container is in compliance, it is not considered further. Otherwise, the procedure calculates the amount of storage S necessary to move the expiration date past $d_i$ in calculating operation 904.

This calculation can be done in several ways. For example, it can be provided by a variant of the life expectancy calculation, or by repeating the life expectancy calculation with different amounts of free storage until the desired life expectancy is attained. The process will try to allocate additional storage from the parent container's reserve in operation 906. If S is available in the parent's reserve, in query operation 908, it is reallocated to the child in allocating operation 910. It is noted that this reallocation does not change the life expectancy of the parent. The life expectancy of the child is then recalculated at operation 912. The process is then completed for the container.

If S is not available in query operation 908, the procedure attempts to replenish the parent's reserve from its other children in replenishing operation 914. The parent's reserve is only increased if there are other children that have an excess of capacity. If replenishment is successful, in operation 916, the procedure continues as before to allocating operation 910.

Otherwise, the procedure allocates the remainder of the parent reserve $f_p$ to the container in allocating operation 918, and recalculates the container's life expectancy and risk in recalculating operation 920. The process then calls the reallocation procedure recursively for the parent's to replenish its now depleted reserve from upper tiers in operation 922. This recursive call could eventually draw on the top tier reserve if necessary. If the reallocation for the parent succeeds in operation 924, the procedure continues working with the same container back in calculating operation 904. If the reallocation for the parent fails, the procedure exits with a request for external intervention in operation 926.

Figure 10:
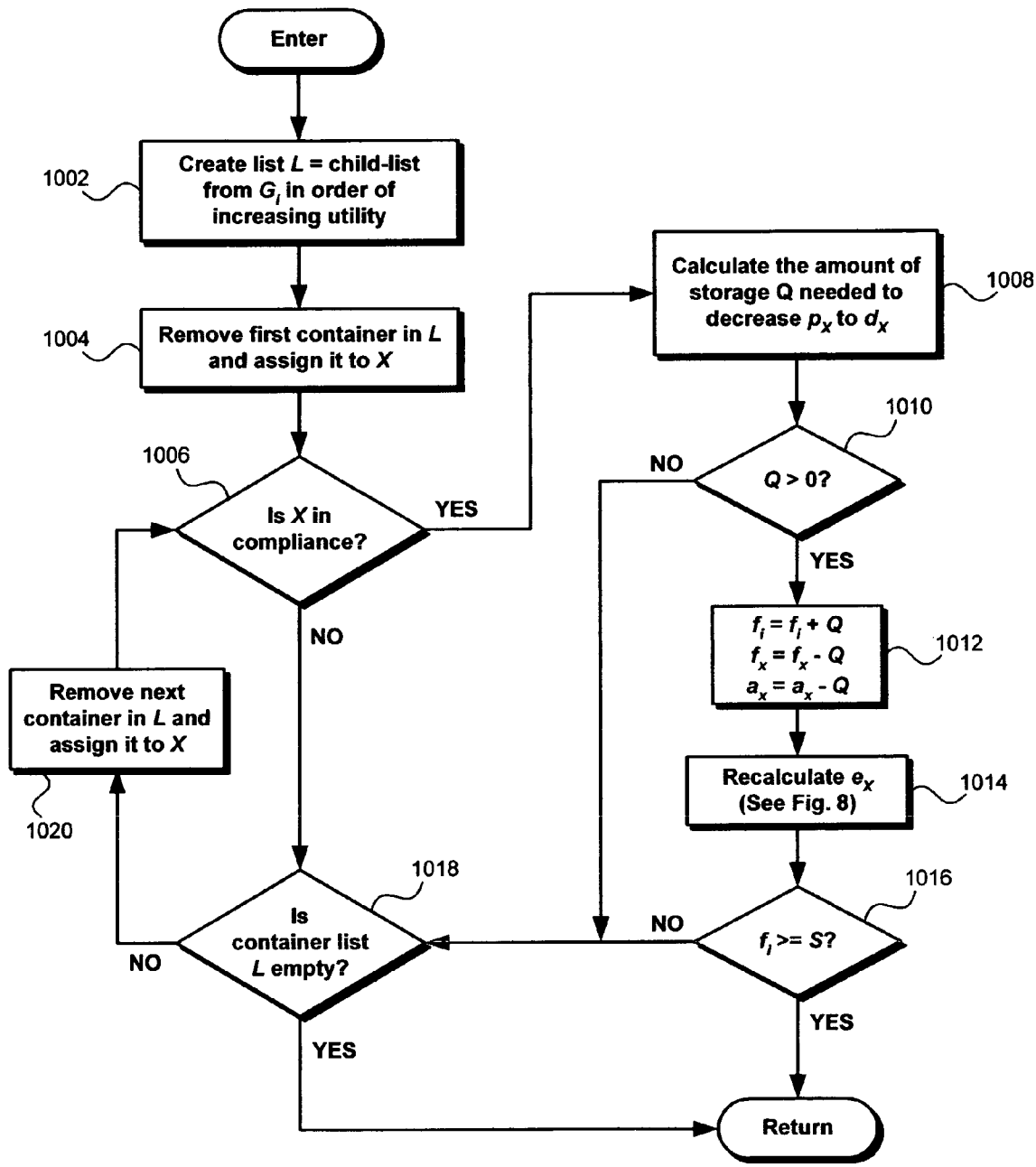
FIG. 10 shows an exemplary procedure for replenishing a parent container's reserve from its children.

In FIG. 10, an exemplary procedure for replenishing a parent container's reserve from its children is shown. Thus, this procedure is used by containers of tier >1 (i.e., that are not leaf nodes). Furthermore, the amount of storage S desired is a parameter to this procedure.

The procedure begins at creating operation 1002, during which a list L of children of the parent container is assembled from $G_i$ in order of lowest utility first. The procedure continues to removing operation 1004, where the first container is removed from the list L. Control flow passes to checking operation 1006, where the container is checked for compliance. If the container is not in compliance, it is not considered further and the process continues by examining other containers in the list L at operations 1018 and 1020.

On the other hand, if the container is in compliance, operations 1008 and 1010 determine if there is any capacity that can be spared. If so, the child container limit $a_x$ is decreased, and the excess capacity Q is returned to the parent's reserve $f_i$ in assigning operation 1012. The life expectancy of the child is recalculated in step 1014. It is noted that the limit, life expectancy, and risk of the parent container do not change. Next, at query operation 1016, the parent container is checked to determine if enough storage has been replenished. If so, the procedure terminates. Otherwise, process flow continues to operations 1018 and 1020 until either enough storage has been reassigned to the parent container or until all child containers have been checked.

The foregoing description of the invention has been presented for purposes of illustration and description. It is not intended to be exhaustive or to limit the invention to the precise form disclosed, and other modifications and variations may be possible in light of the above teachings. As mentioned above, the invention may be applied to various resource systems besides storage systems. For example, consider a server farm consisting of multiple computers connected via a network and a set of customers using the server farm to run an application that uses a flexible number of computers. In this example, the server resource is arranged in two tiers. The top tier is the organization that provides the servers. If additional capacity is needed it must be procured and added to the server farm. The bottom tier consists of customers. The server provider allocates servers to customers from its reserve, or if necessary, between customers as capacity is available. As with storage, this invention assumes that underlying mechanisms exist for performing server allocations, deallocations, and reconfigurations.

The embodiments disclosed were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The invention claimed is:

1. A computer implemented method for managing a multi-tiered resource system, the method comprising:
    automatically determining if a resource tier is in compliance with a management policy, wherein the management policy includes requiring that an expiration date of the resource tier occur after a maintenance date;
    if the resource tier is not in compliance with the management policy, automatically increasing available capacity in containers in order to bring the containers in compliance with the management policy; and
    calculating the expiration date of the resource tier, wherein calculating the expiration date of the resource tier includes calculating a life expectancy of each container belonging to the resource tier, and wherein calculating the life expectancy of the containers includes adjusting the life expectancy of the containers to account for container lead-time.

2. The method of claim 1, wherein increasing available capacity in containers includes allocating additional capacity to containers belonging to the resource tier until the resource tier is in compliance with the management policy.

3. The method of claim 2, wherein allocating additional capacity to the containers includes utilizing a capacity reserve belonging to the resource tier.

4. The method of claim 2, wherein allocating additional capacity to the containers includes utilizing available capacity from other containers in the resource system.

5. The method of claim 2, wherein allocating additional capacity to the containers includes allocating additional capacity to containers of higher importance before allocating additional capacity to containers of lower importance.

6. The method of claim 1, further comprising if the resource tier cannot be brought in compliance with the management policy, alerting that the resource tier is not in compliance with the management policy.

7. The method of claim 1, wherein increasing available capacity in containers includes compressing data within the resource tier until the resource tier is in compliance with the management policy.

\* \* \* \* \*